United States Patent [19]

Poupore

[11] Patent Number: 4,979,328
[45] Date of Patent: Dec. 25, 1990

[54] SMALL FISH TRAP

[76] Inventor: Thomas H. Poupore, 2822 Algonquin Road, Sudbury, Ontario, Canada, P3E 4X6

[21] Appl. No.: 372,164

[22] Filed: Jun. 27, 1989

Related U.S. Application Data

[63] Continuation of Ser. No. 202,666, Jun. 6, 1988, abandoned.

[51] Int. Cl.$^5$ ............................................. A01K 61/08
[52] U.S. Cl. ...................................................... 43/100
[58] Field of Search ..................... 43/100, 103, 105, 56

[56] References Cited

U.S. PATENT DOCUMENTS

| | | | |
|---|---|---|---|
| 2,533,617 | 12/1950 | Palmer | 43/100 |
| 2,979,855 | 4/1961 | Bowsher | 43/100 |
| 4,411,092 | 10/1983 | Lalancette | 43/100 |

FOREIGN PATENT DOCUMENTS

| | | | |
|---|---|---|---|
| 2609215 | 9/1976 | Fed. Rep. of Germany | 43/100 |
| 32122 | 4/1921 | Norway | 43/100 |
| 118742 | 4/1947 | Sweden | 43/100 |
| 120977 | 2/1948 | Sweden | 43/100 |

*Primary Examiner*—Kurt Rowan
*Attorney, Agent, or Firm*—Arnold, White & Durkee

[57] ABSTRACT

Disclosed is a trap for small fish comprising annular top and bottom panels, each with a peripheral edge and at least one side panel means therebetween. The side panel is attached to the top and bottom panels whereby the side panel extends between the top and bottom panels and extends about a substantial portion of the peripheral edges thereof. The ends of the side panel are directed inwardly from the peripheral edges and define an opening. A leader is attached to the top and bottom panels with an end of the leader in line with and spaced from the opening, the other end of the leader extending outwardly of the peripheral edges of the top and bottom panels. Preferably the leader is detachably secured to the top and bottom panels and the top, bottom and side panel are also preferably detachable to one another with each side panel of like construction to the leader. The top and bottom panels can be identical with a portion molded in such a way to be severable to define a hinged trap door. The invention also comprehends a kit for assembling a fish trap including two annular panels each having a peripheral edge and at least one generally rectangularly configured panel having opposed sides and opposed ends. The sides of the at least one rectangular panel and each annular panel have means for detachable assembly of the trap.

14 Claims, 4 Drawing Sheets

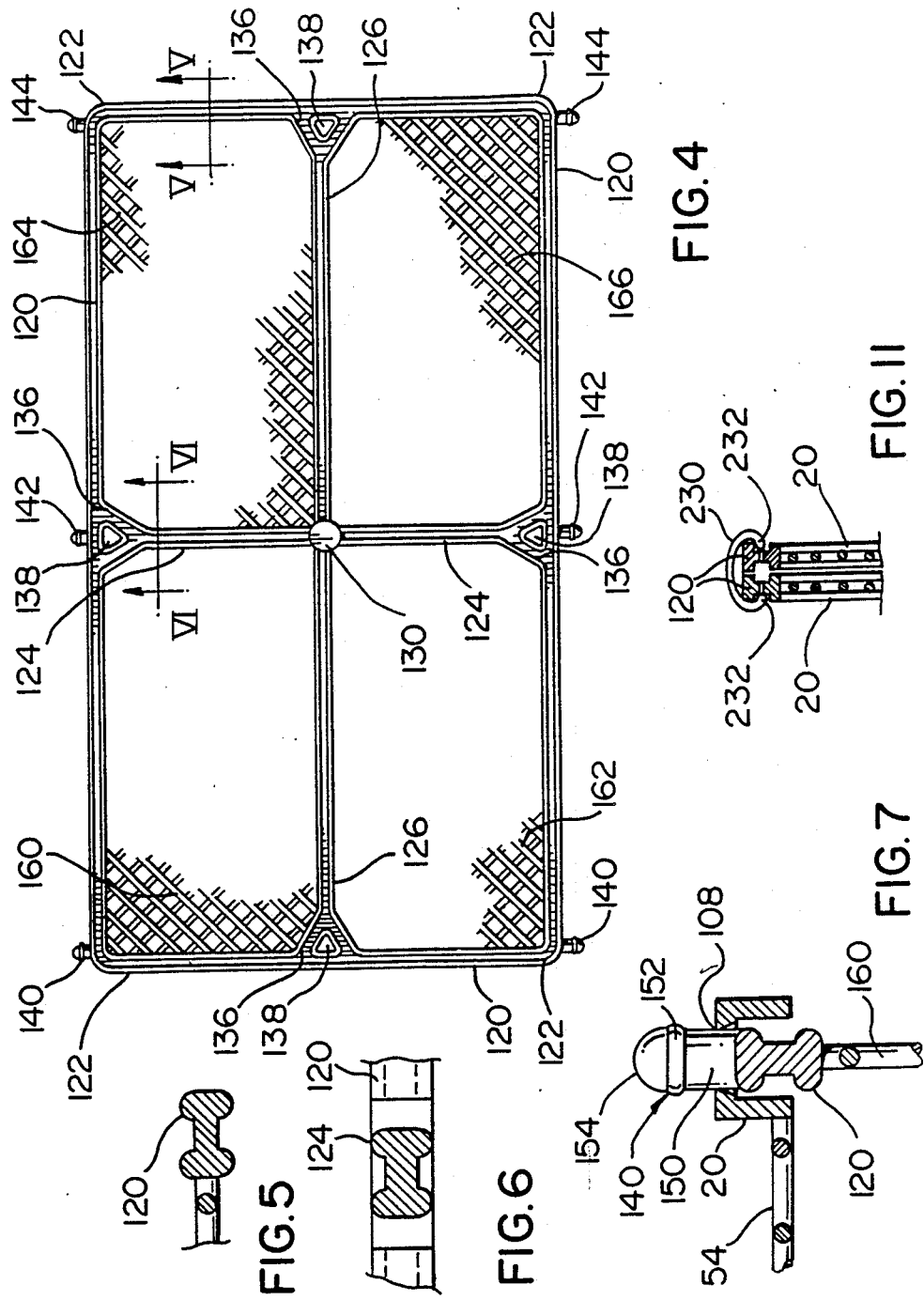

SMALL FISH TRAP

This is a continuation of Ser. No. 202,666 filed June 6, 1988, now abandoned.

FIELD OF THE INVENTION

The invention relates to traps for fish and more particularly a trap for minnows and the like which is of simple construction and easily assembled and disassembled as desired.

BACKGROUND OF THE INVENTION

Minnow or small fish traps are common and have been used for many, many years. The simplest are probably those dish shaped screens held at the end of a pole and manipulated by the holder of the pole as a school of minnows passes over the screen.

Also known are substantially closed traps having an opening through which the minnows are led or enticed by bait, an opening usually shaped or located such that the fish cannot easily escape.

The U.S. Pat. No. to Lalancette, No. 4,411,092, Oct. 25, 1983 relates to such a trap comprising a wire mesh basket provided with a central opening which trap has a cardioidal structure which reduces the possibilities for a fish to escape.

The U.S. Pat. to Bowsher, No. 2,979,855 granted Apr. 18, 1961 also discloses a minnow trap substantially heart shaped and having a central opening in one end, the trap having a pair of complemental separable half sections with means for connecting the half sections for longitudinal sliding movement relative to each thereby providing access openings at the other end for removing minnows.

Although the above types of traps are known, it has not been customary to include a leader or tail associated with the opening of the trap to help lead or guide the fish into the trap particularly when the &rap does not have bait or the bait has disappeared.

Accordingly, there is believed to be a need for a minnow and the like trap wherein the construction is simple and made from as few parts or sections as possible.

Further, there is believed to be a need for a trap for small fish which includes a leader means associated with the mouth or opening of the trap to lead or guide the fish into the trap.

Still further, there is believed to be a need for a minnow or like trap wherein the construction is simple and the trap is made of detachable panels or sections which can include not only the leader bu& also the top, bottom and sides of the trap.

SUMMARY OF THE INVENTION

In one broad aspect, the invention pertains to a trap for small fish comprising top and bottom panel means, each with a peripheral edge and side panel means having sides and opposed ends. The side panel means is attached to the top and bottom panel means, whereby the side panel means extends between the top and bottom panel means and extends about a substantial portion of the peripheral edges thereof. The ends of the side panel means are directed inwardly from the peripheral edges and define an opening. Leader means is attached to the top and bottom panel means with an end of the leader means in line with and spaced from the opening, the other end of the leader extending outwardly of the peripheral edges of the top and bottom panels. Preferably the leader means is detachably secured to the top and bottom panels. The top, bottom and side panel means are also preferably detachable to one another with the side panel means comprising panels of like construction to the leader.

In another broad aspect the invention pertains to a trap for fish comprising top and bottom panels, each with a peripheral edge, and side panel means having opposed sides and opposed ends. The top and bottom panels and the sides of the side panel means having cooperating means for detachably securing the top and bottom panels to the side panel means, whereby the side panel means extends between the top and bottom panels and extends about at least a portion of the peripheral edge of each of the top and bottom panels. The ends of the side panel means are directed inwardly from the peripheral edges of the top and bottom panels to define an opening into the trap.

Preferably the side panel means comprises two identical side panels, with the side panels each having an end at a location substantially opposite the opening and extending in opposite directions, each around more than 90° of the peripheral edge of each top and bottom panel whereby the other ends of the two side panels define the opening. Still more preferably, the top and bottom panels are identical and include means selectively severable to define a trap door.

Another aspect of the invention comprehends a leader with sides and ends, and means for detachably securing an end of the leader to the top and bottom panels in line with and spaced from the opening, the other end of the leader extending outwardly of the peripheral edges of the top and bottom panels. Preferably the leader and the two side panels are identical.

Still further the invention comprehends a kit for assembling a fish trap including two annular panels each having a peripheral edge and at least one generally rectangularly configured panel having opposed sides and opposed ends. The at least one rectangular panel and each annular panel has means for detachable assembly of the sides of the rectangular panel to the annular panels whereby when the panels are assembled to form the trap, the rectangular panel is adapted to extend between the annular panels and about at least a substantial portion of the peripheral edge of the annular panels. The ends of the at least one side panel means are adapted to extend inwardly toward the center of the annular panels and define an opening.

Preferably the kit has two generally identical annular panels and two generally identical rectangular panels, each of the rectangular panels and the annular panels having means for detachable assembly of an annular panel to each of the sides of the rectangular panels. When the panels are assembled, each side panel extends generally perpendicular to and between the annular panels with an end of one rectangular panel adjacent an end of the second rectangular panel. Each rectangular panel is adapted to extend about at least a substantial portion of the peripheral edge of the annular panels with the other ends of each side panel being adapted to extend inwardly toward the center of the annular panels to define the opening when the panels are assembled.

Preferably the kit has a third rectangular panel with sides and ends, the third panel and the annular panels having means adapted to detachably secure the third rectangular panel as a leader whereby, when the panels are assembled to form a trap, an end of the third panel is in line with and spaced from the opening and the other end of the third panel extends outwardly of the edges of the annular panels.

Other aspects and features of the invention will become more apparent from a review of the detailed description herein of a preferred embodiment of the invention and variations thereto.

BRIEF DESCRIPTION OF THE DRAWINGS

FIG. 4 is an elevational view of the panel adapted to provide sides and the leader of the trap.

FIG. 5 is a sectional view along line 5—5 of FIG. 4.

FIG. 6 is a sectional view along line 6—6 of FIG. 4.

FIG. 7 is a sectional view along line 7—7 in FIG. 1 showing the cooperation of a side panel fastener means with a part of the top panel (the cooperation with a part of the bottom the same).

FIG. 11 is a partial sectional view of a leader extension clip, and appears with FIG. 4.

DESCRIPTION OF THE PREFERRED EMBODIMENT

Figure 1:
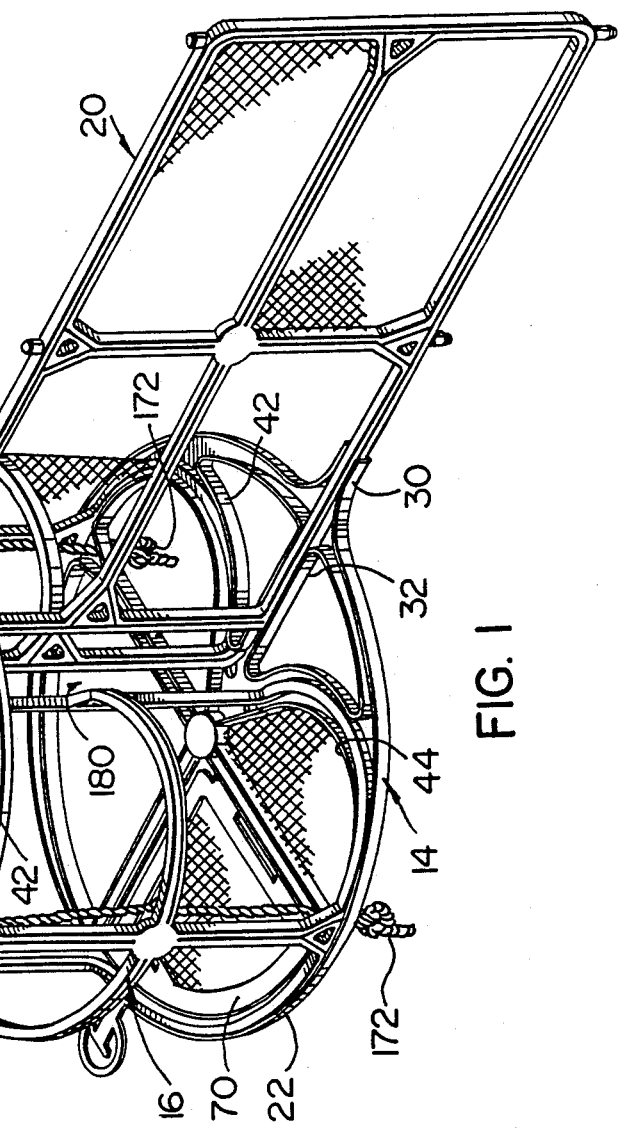
FIG. 1 is a perspective view of the preferred trap of this invention showing all parts including the leader assembled but with minimum mesh being shown for purposes of clarity.
Figures 8, 9:
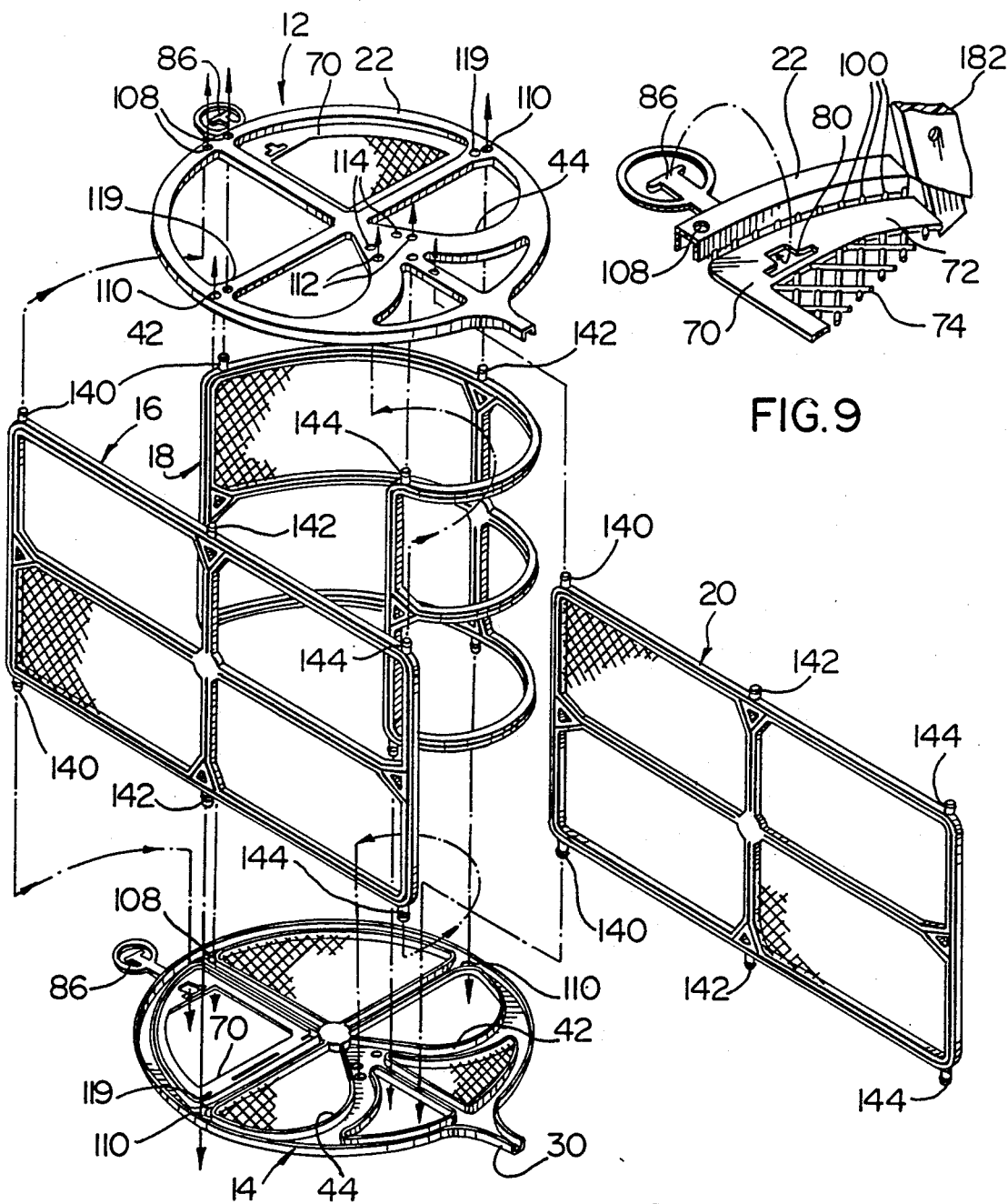
FIG. 8 is an exploded perspective view of the trap showing how the various panels are connected to assemble the trap, with minimum mesh being shown for purposes of clarity.
FIG. 9 is a partial view of the trap door and the latch means.

FIG. 1 is a perspective view of the small fish or minnow trap 10 including identically plastic molded top and bottom panels 12 and 14 respectively and identical side panels and lead in panel 16, 18 and 20 respectively. FIG. 8 is an exploded perspective view of trap 10 showing the assembly of top and bottom panels 12 and 14 with side panels 16 and 18 and leader section 20.

Figure 2:
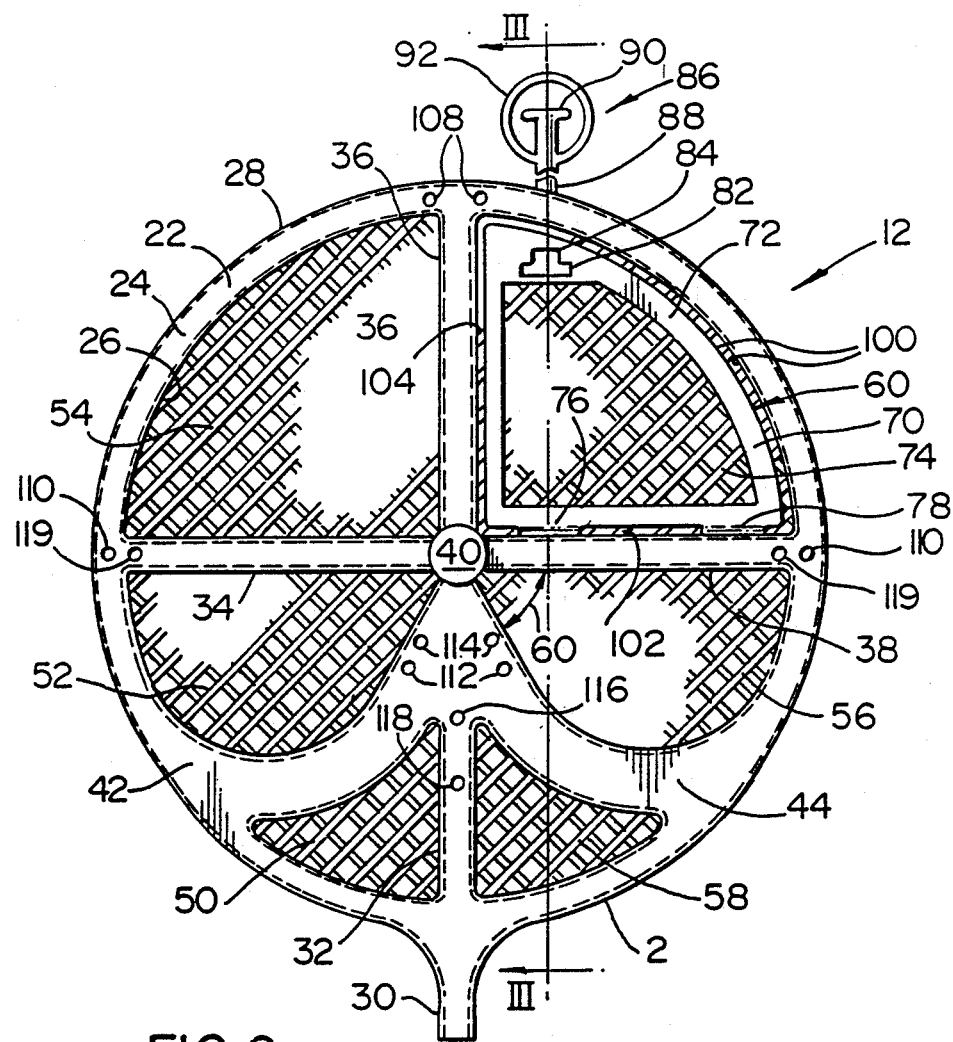
FIG. 2 is a plan view of the panel adapted to provide a top and bottom to the trap.
Figure 3:
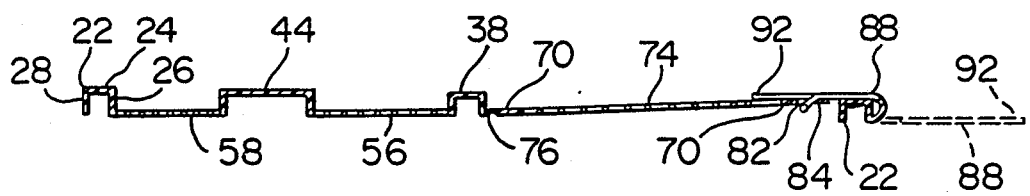
FIG. 3 is a sectional view of the panel of FIG. 2 taken along line 3—3 therein.

The top panel 12 is further illustrated in FIGS. 2 and 3. Since both panels 12, 14 are identically constructed, reference will be made only to the one panel - top panel 12.

Panel 12 comprises a channel-shaped annular rim 22 having bight portion 24 and perpendicularly extending inner and outer sides 26 and 28. Curvingly integral with rim 22 and of like cross-sectional configuration thereto is channel-shaped leader support 30. Channel-shaped cross supports 32, 34, 36 and 38 are of like configuration and construction to rim 20 and support 30 and extend radially inwardly from rim 22 with cross supports 34, 36 and 38 meeting at annular center 40. Cross support 32 meets curving channel-shaped side panel support sections 42 and 44 which are mirror images of each other and curve from rim 22 into and meet center 40 at an angle of about 60° relative to cross supports 32 and 34. In plan view the peripherally larger portion of rim 22 with sections 42 and 44 provide a cardioidal shape channel means.

It will be seen that the areas within and defined by rim 20, the various cross supports 32, 34, 36 and 38 and side panel support sections 42 and 44 are screened areas or sections 50, 52, 54, 56 and 58.

The one variation is in quadrant-shaped area 60 which has a solid inner border 70 peripherally complementary to area 60 and defining a trap door 72, the area inwardly of the border 70 being screened by screening 74. Door 72 is hinged to cross channel support 38 by flexible hinge means 76 and 78 shown in FIG. 3 to be a portion of the border material reduced in thickness. Trap door border 70 has an inverted "T" shaped aperture 80 which aperture includes head portion 82 and leg portion 84. Latch means 86 is T-shaped and comprises flexible strap portion 88 integrally connected with rim 20 and head portion 90 adapted to pass through head portion 82 of T-shaped aperture 80 and lock with leg portion 84 as seen in FIG. 3. Ring 92 provides grasping means for latch means 86. FIG. 3, being a sectional view along line 3—3 of FIG. 2, shows the latch means 86 in operative association (solid lines) with aperture 80 (the dotted line in FIG. 3 showing closure means 86 as seen in FIG. 2).

It will be noted that between trap door border 70 and the associated portions of supports 36, 38 and rim 20 are ribs 100, 102, 104 which are integrally molded with the section 12 (and section 14). Ribs 100, 102 and 104 of at least one panel 12 or 14 are cut out by a user of the device after purchase to provide for operation of the trap door. Latch means 86 can be cut off the panel (e.g. the bottom panel) on which the trap door is not used.

A plurality of apertures in panel 12 (and panel 14) are located as shown, two adjacent apertures 108 in channel rim 22, two diametrically opposed apertures 110 in rim 22, two sets of apertures 112, 114 in curved sections 42, 44 and two apertures 116 and 118 in leader cross support 32. Apertures 119 are formed at the junction of rim 22 and cross supports 34 and 38 for attaching carrying means as more fully described herein.

Each top panel 12 and bottom panel 14 including all screened or ribbed areas therein is completely plastic molded as a unit with a molding gate at center 40, a preferred plastic being polyethylene. It will be appreciated that ribs 100, 102 and 104 along with hinges 76 and 78 permit the moldable material to flow into the appropriate cavities to form trap door 72 with ribs 100, 102 and 104 being cut as noted before and hereinafter by the customer or user as desired.

Turning to FIG. 1 and FIGS. 4, 5 and 6, the side panels and leader section 16, 18 and 20 are identically molded of plastic (polyethylene) and only one, namely leader 20, is fully described. Leader 20 comprises a generally rectangular I-beam shaped frame 120 with curved corners 122 and longitudinally and laterally extending cross supports 124 and 126 also of I-beam configuration, which cross supports 124 and 126 meet at center 130. The opposed ends 132, 134 of cross supports 124, 126 respectively are similarly constructed with diverging web portion 136 about aperture 138.

Extending outwardly from the longitudinal sides of frame 120, adjacent corners 122 and cross support 126, are fastener means 140, 142 and 144 shown enlarged in FIG. 7 in the form of cylindrical posts 150 having annular rib 152 and rounded or hemispherical top 154.

FIG. 7 further shows the cooperation of an aperture 108 with fastener means 140 and the same cooperation applies between other fastener means 142, 144 and the various other apertures, 110, 112, 114, 116 and 118. It will be noted from FIG. 7 that aperture 108 is, as with all like apertures, slightly conical in cross-section to facilitate assembly of fastener means 140 therewith. The dimensions of post 150, annular rib 152 and aperture 108 are such that a "snap action" detachable connection is provided.

Leader 20 and side panels 16 and 18, including screened areas 160, 162, 164 and 166, are each integrally molded of plastic e.g. polyethylene, with a molding gate being at center 130.

As seen in FIG. 1, rope 170 has ends threaded through apertures 119 in top panel 12 and bottom panel 14 and the rope has knotted ends 172 to provide lifting and carrying means for the trap.

From a review of FIGS. 8 and 9, the assembly of trap 10 from a kit of panels will be apparent. A kit for a "domestic" trap (i.e. a trap having a diameter limited to about 12") would include two identical circular panels and three identical rectangular panels, one of the circular panels forming top panel 14 and the other circular panel forming bottom panel 16. Two rectangular panels form side panels 16 and 18 having respective end fasteners 140 for snap fit assembly with one of the adjacent apertures 108. Each side panel follows channel rim 22 on opposed sides so that intermediate fasteners 142 are secured in respective apertures 110 and end fasteners 144 are secured in respective apertures 114 (or 116), the side panels 16, 18 extending about rim 22 for more than 90° before curving inwardly toward center 40 via curved channel means or sections 42 and 44. FIG. 9 shows side panel 16 straight whereas side panel 18 is curved in a manner for assembly with top and bottom panels 12 and 14. The two side panels when in position and secured to the top and bottom panels have a cardioidal configuration in plan view.

Leader 20 has fasteners 140 secured in apertures 116 and extends along and is held within channel shaped leader support 30 and cross support 32.

When assembled and in use, minnows and the like will be guided or led by leader 20 into mouth 180 defined by the ends of side panels 16 and 18 within curved channel portions 42 and 44.

It will be appreciated that side panel fasteners 144 can be located in respective apertures 114 which will alter the width of mouth 180 and leader fasteners 140 can be located in apertures 118 to coincide with any desired adjustment in the size of the mouth 180 relative to the end of the leader. The width of curved channel portions 42 and 44 is such as to allow for movement of the side panels in the adjustment of the width of the mouth or opening into the trap.

After assembly of the various panels, a knife 182, as shown in FIG. 9, is used to cut ribs 100 (and ribs 102, 104) about border 70 of the door 72 in the top panel and the door may be selectively latched by latch means 86. Rope 170 may then be secured as previously indicated, the rope being knotted at 172 below the bottom panel 14 so that any pull on rope 170 will lift trap 10 as a unit.

The user may wish to insert a few stones or the like in the trap to maintain it on the bottom, particularly in water where currents are a factor.

Various modifications of the invention will be apparent to those skilled in the art. By way of example, it will be appreciated that leader 20, although preferred, need not be included in a kit or with an assembled trap and could be sold separately as an optional item.

Figure 10:
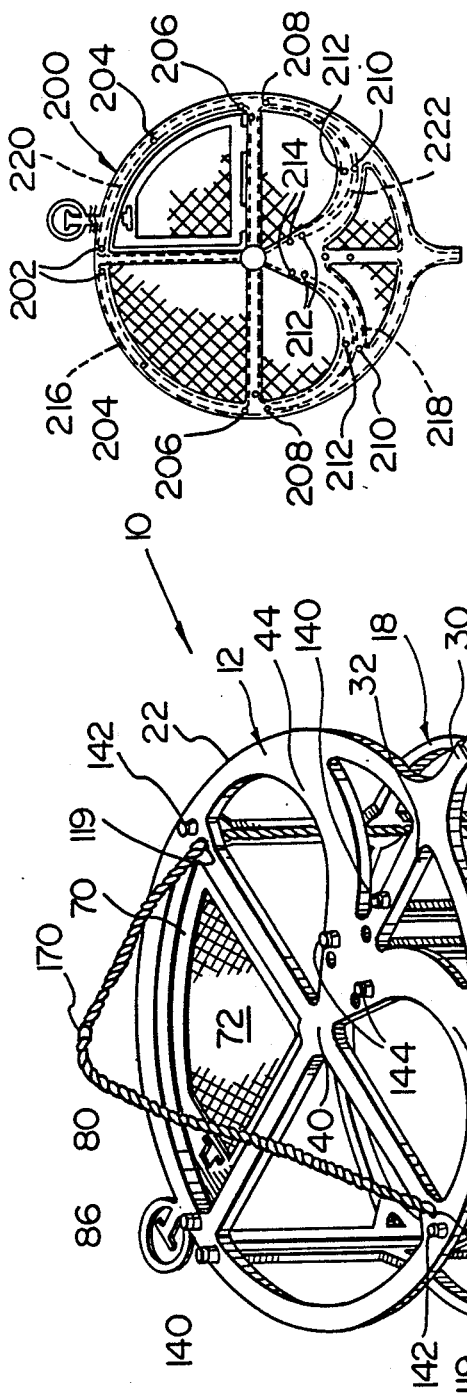
FIG. 10 is a schematic view of the top panel of a larger diameter trap, and appears with FIG. 1.

Further, as shown schematically in FIG. 10, which shows only a top panel 200, a "commercial" trap (having a diameter limited to about 24") can be sold in kit or assembled form wherein the top 200 (identical bottom, not shown) has apertures 202, 204, 206, 208, 210, 212 and 214. Four side panels 216, 218, 220 and 222, shown in dotted lines, are used to form the sides and mouth of the trap and these panels are identical to side panels 16 and 18 (and leader 20). Accordingly, rather than molding two longer side panels for the commercial larger diameter trap, the same side panels as used with the domestic trap can be used thereby adding to the cost effective production of the different sized traps. A variation on the above, but not shown, would be to have a larger side panel which is effectively the length of two panels 16 and 18. The apertures in rim 22 of the smaller or "domestic" trap would then be such to accommodate the fastener elements of one longer side panel. Only two of the longer side panels would then be used when assembling the larger or "commercial" trap with appropriate locations of the apertures in the rim of panel 200 (similar to those of FIG. 2).

It will be further appreciated that with a larger diameter trap, additional leader length may be desired and a second leader panel 20 can be provided, the user simply tying the two together in an appropriate manner to extend the leader. Alternatively, a flexible plastic clip 230, as shown schematically in FIG. 11, could be used to detachably connect the leader extension in an extended substantially planar manner, one clip 230 used on the top support 120 and one on bottom support 120, the opposed ends 232 of each clip engaging the web of the respective supports 120.

Although not the most preferred, it will be apparent that a trap door could be formed in the rectangular panels with the trap door in one of the side panels being cut for operation in a manner similar to door 72 referred to above.

Accordingly, there is provided a small fish or minnow trap which is easy to package in kit form, which can be easily assembled and disassembled, and therefore can be stored without difficulty. The trap is manufactured with a minimum of parts, sections or panels and provides for variation in the size of the trap from domestic to commercial with minimum variations in the types of panels required. There is also provided a small fish trap which includes a leader, preferably a detachable leader.

Because many other variations, modifications and embodiments may be made of the invention without departing from the scope thereof, it is understood that all matters set forth or shown is to be interpreted as illustrative and not in a limiting sense, the scope of protection being limited only by the scope of the claims appended hereto.

The embodiments of the invention in which an exclusive property or privilege is claimed are defined as follows:

1. A trap for fish comprising:
  top and bottom panels, each with a peripheral edge and side panel means having opposed sides and opposed ends;
    said top and bottom panels and the sides of said side panel means having cooperating means for detachably securing said top and bottom panels to said side panel means, whereby said side panel means extends between said top and bottom panel to and extended about at least a portion of the peripheral edge of each of said top and bottom panels;

at least some of the ends of said side panel means being directed inwardly from the peripheral edges and defining an opening;

said side panel means comprising two identical side panels, said side panels each having an end at a location substantially opposite said opening and extending in opposite directions around more than 90° of the peripheral edge of each said top and bottom panels, the other ends of said two side panels defining said opening;

a leader with sides and ends, and means for detachably securing said leader to said top and bottom panels wherein an end of the leader is in line with and spaced from said opening, the other end of the leader extending outwardly of the peripheral edges of the top and bottom panels.

2. The trap according to claim 1 wherein the top and bottom panels are identical and include means selectively severable to define a trap door.

3. The trap according to claim 1 wherein said leader and said two side panels are identical.

4. The trap according to claim 3 wherein said top and bottom panels are identical.

5. A trap for fish comprising:

top and bottom panels, each with a peripheral edge and side panel means having opposed sides and opposed ends;

said top and bottom panels and the sides of said side panel means having cooperating means for detachably securing said top and bottom panels to said side panel means, whereby said side panel means extends between said top and bottom panels and extends about at least a portion of the peripheral edge of each of said top and bottom panels;

at least some of the ends of said side panel means being directed inwardly from the peripheral edges and defining an opening;

wherein each said top and bottom panel is of molded plastic and the peripheral edge thereof comprises first channel means, each top and bottom panel including second channel means and third channel means with each curving inwardly from peripherally spaced mirror imaged locations on the first channel means, toward and meeting adjacent the center of the respective top and bottom panels, the sides of said side panel means adapted to be detachably secured within said first, second and third channel means, with ends of the side panel means defining said opening adjacent the juncture of said second and third channel means;

and wherein there are two identical side panels, said side panels each having an end at a location substantially opposite said opening and extending in said first channel means in opposite directions about a portion of the peripheral edge of said top and bottom panels and extending in the associated second channel means or third channel means, the other ends of said side panels defining said opening.

6. The trap according to claim 5 further including a leader which is identically configured to said two side panels, said top and bottom panels including fourth channel means extending in a direction intersecting said first channel means and meeting the second and third channel means at the juncture thereof, means for detachably securing said leader to said top and bottom panels wherein an end of the leader is in line with said opening, the other end of said leader extending outwardly beyond the periphery of said top and bottom panels, with a portion of the sides of said leader within the respective fourth channel means of aid top and bottom panels.

7. The trap according to claim 6 wherein the detachable securement means each include aperture means through the top and bottom panels within said respective channels, and the sides of said side panels and leader include a plurality of laterally outwardly extending posts, the posts including means which are sized to cooperate with said aperture means in a snap action fit.

8. A trap for fish comprising:

top and bottom panels, each with a peripheral edge and side panel means having opposed sides and opposed ends;

said top and bottom panels and the sides of said side panel means having cooperating means for detachably securing said top and bottom panels to said side panel means, whereby said side panel means extends between said top and bottom panels and extends about at least a portion of the peripheral edge of each of said top and bottom panels;

at least some of the ends of said side panel means being directed inwardly from the peripheral edges and defining an opening;

each said top and bottom panel is of molded plastic and the peripheral edge thereof comprises first channel means, each top and bottom panel including second channel means and third channel means with each curving inwardly from peripherally spaced mirror imaged locations on the first channel means, toward and meeting adjacent the center of the respective top and bottom panels, the sides of said side panel means adapted to be detachably secured within said first, second and third channel means, with ends of the side panel means defining said opening adjacent the juncture of said second and third channel means;

there are four identical side panels, two of said four side panels having a first end at a location substantially opposite said opening and extending in said first channel means in opposite directions about a portion of the peripheral edge of said top and bottom panels, the other ends of said two side panels being at a location substantially diametrically opposite each other, the two other side panels of said four side panels having first ends adjacent said other ends of said two panels and extending respectively in said first channel means and into associated second or third channel means with the other ends of said other two panels defining said opening.

9. The trap according to claim 8 further including leader means extending in a direction having opposed ends and opposed sides, said top and bottom panels including fourth channel means intersecting said first channel means and meeting the second and third channel means at the juncture thereof, means for detachably securing said leader means to said top and bottom panels wherein an end of said leader means is in line with said opening, the other end of said leader means extending outwardly beyond the periphery of said top and bottom panels, with a portion of the sides of said leader means within respective fourth channel means of said top and bottom panels.

10. The trap according to claim 9 wherein said leader means comprises two panels identically configured to said side panels, and clip means detachably securing adjacent ends of said two panels in a substantially extended planar manner to form said leader means.

11. A kit for assembling a fish trap including:

two annular panels each having a peripheral edge, and two generally identical rectangularly configured panels having opposed sides and opposed ends;

each of said rectangular panels and said annular panels having means for detachable assembly of an annular panel to each of the sides of said rectangular panels, whereby when the panels are assembled to form the trap, each side of said rectangular panel extends between said annular panels with an end of one rectangular panel adjacent an end of the second rectangular panel, each rectangular panel being adapted to extend about at last a substantially portion of the peripheral edge of said annular panels with the other ends of each of said rectangular panels being adapted to extend inwardly toward the center of said annular panels to define an opening;

said kit has a third rectangular panel with sides and ends, said third panel and said annular panels having means adapted to detachably secure said third rectangular panel as a leader, whereby when the panels are assembled a trap, an end of said third panel is in line with and spaced from said opening, the other end of the third panel extending outwardly of the edges of the annular panels.

12. The kit according to claim 11 wherein said third rectangular panel and said two rectangular panels are identical.

13. The kit according to claim 12 wherein said annular panels are identical and include means selectively severable to define a trap door.

14. A kit for assembling a fish trap including:

two annular panels each having a peripheral edge, and at least one generally rectangularly configured panel having opposed sides and opposed ends;

said at least one rectangular panel and each annular panel having means for detachable assembly of the sides of said rectangular panel to said annular panels, whereby when the panels are assembled to form the trap, said rectangular panel is adapted to extend between said annular panels and about at least a substantial portion of the peripheral edge of said annular panels, the ends of said at least one rectangular panel means being adapted to extend inwardly toward the center of said annular panels and defining an opening;

wherein each said annular panel is of molded plastic and the peripheral edge thereof comprises first channel means with second and third channel means curving inwardly from peripherally spaced mirror imaged locations adjacent the first channel means, said second and third channel means curving toward and meeting adjacent the center of the respective annular panel, said at least one rectangular panel also being of molded plastic and the sides of said at least one rectangular panel means being adapted to be detachably secured within said first, second and third channel means, the ends of said at least one rectangular panel means being adapted to define said opening adjacent the juncture of said second and third channel means when the panels are assembled;

wherein there are two identical rectangular panels, each rectangular panel having opposed ends and adapted to be detachably secured with said annular panels, whereby when the panels are assembled to form the trap, each rectangular panel is adapted to extend from a joint location with the sides in said first channel means about a portion of the peripheral edge of said annular panels and extend in the associated second or third channel means, so that ends of the rectangular panels define said opening.

* * * * *

UNITED STATES PATENT AND TRADEMARK OFFICE
CERTIFICATE OF CORRECTION

PATENT NO. : 4,979,328

DATED : December 25, 1990

INVENTOR(S) : Thomas H. Poupore

It is certified that error appears in the above-identified patent and that said Letters Patent is hereby corrected as shown below:

In column 1, line 39, "&rap" should read --trap--.

In column 6, line 66, "panel to and extended" should read --panels and extends--.

In column 8, line 2, "aid" should read --said--.

In column 9, line 18, "at last a substantially" should read --at least a substantial--.

Signed and Sealed this

Ninth Day of February, 1993

Attest:

STEPHEN G. KUNIN

Attesting Officer

Acting Commissioner of Patents and Trademarks